US009582127B2

(12) United States Patent
Vandermeijden (10) Patent No.: US 9,582,127 B2
(45) Date of Patent: Feb. 28, 2017

(54) LARGE FEATURE BIOMETRICS USING CAPACITIVE TOUCHSCREENS

(71) Applicant: Synaptics Incorporated, San Jose, CA (US)

(72) Inventor: Tom Vandermeijden, Los Gatos, CA (US)

(73) Assignee: Synaptics Incorporated, San Jose, CA (US)

( * ) Notice: Subject to any disclaimer, the term of this patent is extended or adjusted under 35 U.S.C. 154(b) by 102 days.

(21) Appl. No.: 14/580,010

(22) Filed: Dec. 22, 2014

(65) Prior Publication Data

US 2015/0286313 A1    Oct. 8, 2015

Related U.S. Application Data

(60) Provisional application No. 61/975,362, filed on Apr. 4, 2014.

(51) Int. Cl.
| | |
|---|---|
| G06K 9/00 | (2006.01) |
| G06F 3/044 | (2006.01) |
| G06F 3/0488 | (2013.01) |
| G06F 21/32 | (2013.01) |

(52) U.S. Cl.
CPC .......... G06F 3/044 (2013.01); G06F 3/04883 (2013.01); G06F 21/32 (2013.01); G06K 9/00154 (2013.01); G06K 9/00181 (2013.01)

(58) Field of Classification Search
CPC .......... G06F 21/31; G06F 21/32; G06F 3/044; H04L 63/0861; H04L 9/3231; H04W 12/06; H04W 12/08; G06Q 20/40145; G06K 9/00885; G06K 9/00892; G06K 9/6201

See application file for complete search history.

(56) References Cited

U.S. PATENT DOCUMENTS

| | | |
|---|---|---|
| 5,349,174 A | 9/1994 | Van Berkel et al. |
| 6,327,376 B1 | 12/2001 | Harkin |
| 7,496,763 B2 | 2/2009 | Chiu et al. |
| 7,606,400 B2 | 10/2009 | Ryhanen et al. |
| 8,010,798 B1 | 8/2011 | Lemke |
| 8,063,889 B2 | 11/2011 | Anderson |

(Continued)

FOREIGN PATENT DOCUMENTS

WO    2012078061 A1    6/2012

*Primary Examiner* — Dwayne Bost
*Assistant Examiner* — Maheen Javed
(74) *Attorney, Agent, or Firm* — Osha Liang LLP (57) ABSTRACT

An input device including: a display device including a first display region; a plurality of sensor electrodes configured for capacitive sensing, where the plurality of sensor electrodes overlap at least a portion of the first display region; and a processing system operatively connected to the plurality of sensor electrodes and configured to: output a placement guide graphic on the first display region, where the placement guide provides alignment indication for a feature of an input object; generate a pressure-gauge graphic based on pressure exerted on the input device by the input object; send the pressure-gauge graphic for display while the input object is still in contact with the input device; obtain, based on resulting signals received with at least one sensor electrode of the plurality of sensor electrodes, a first capacitive image including the input object; and authenticate a user based on at least the first capacitive image.

23 Claims, 6 Drawing Sheets

(56) References Cited

U.S. PATENT DOCUMENTS

| | | |
|---|---|---|
| 8,332,019 B2 | 12/2012 | Shimuta et al. |
| 2006/0039050 A1* | 2/2006 | Carver .................... G02B 5/32 |
| | | 359/32 |
| 2012/0182253 A1 | 7/2012 | Brosnan |
| 2013/0093717 A1 | 4/2013 | Zank |
| 2013/0194223 A1 | 8/2013 | Ward et al. |
| 2013/0223700 A1 | 8/2013 | Huang et al. |
| 2013/0271422 A1 | 10/2013 | Hotelling et al. |
| 2013/0287272 A1 | 10/2013 | Lu et al. |
| 2013/0307818 A1 | 11/2013 | Pope et al. |
| 2014/0003683 A1 | 1/2014 | Vieta et al. |
| 2014/0047706 A1 | 2/2014 | Shaikh et al. |
| 2014/0079300 A1* | 3/2014 | Wolfer ............... G06K 9/00013 |
| | | 382/124 |
| 2014/0176332 A1* | 6/2014 | Alameh ................ G06F 21/32 |
| | | 340/665 |
| 2014/0250515 A1* | 9/2014 | Jakobsson ............ H04L 9/3231 |
| | | 726/7 |
| 2015/0213245 A1* | 7/2015 | Tartz ..................... G06F 21/83 |
| | | 726/17 |
| 2015/0356286 A1* | 12/2015 | Quirk ................ G06K 9/00087 |
| | | 726/19 |

* cited by examiner

LARGE FEATURE BIOMETRICS USING CAPACITIVE TOUCHSCREENS

CROSS-REFERENCE TO RELATED APPLICATIONS

This application claims priority pursuant to 35 U.S.C. §119(e) to U.S. Provisional Patent Application No. 61/975,362, filed on Apr. 4, 2014, and entitled "Large Feature Biometrics Using Capacitive Touchscreens." U.S. Provisional Patent Application No. 61/975,362 is herein incorporated by reference in its entirety.

FIELD

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments of the invention relate to an input device. The input device comprises: a display device comprising a first display region; a plurality of sensor electrodes configured for capacitive sensing, wherein the plurality of sensor electrodes overlap at least a portion of the first display region; and a processing system operatively connected to the plurality of sensor electrodes and configured to: output a placement guide graphic on the first display region, wherein the placement guide provides alignment indication for a feature of an input object; generate a pressure-gauge graphic based on pressure exerted on the input device by the input object; send the pressure-gauge graphic for display while the input object is still in contact with the input device; obtain, based on resulting signals received with at least one sensor electrode of the plurality of sensor electrodes, a first capacitive image comprising the input object; and authenticate a user based on at least the first capacitive image.

In general, in one aspect, embodiments of the invention relate to a method for operating an input device comprising a display device. The method comprises: displaying, on a first display region of the display device, a placement guide graphic, wherein the placement guide graphic provides alignment indication for a feature of an input object; generating a pressure-gauge graphic based on pressure exerted on the input device by the input object; sending the pressure-gauge graphic for display while the input object is still in contact with the input device; obtaining, based on resulting signals received with at least one sensor electrode of a plurality of sensor electrodes, a first capacitive image comprising the input object; and authenticating the user by comparing the first capacitive image to a plurality of biometrics data.

In general, in one aspect, embodiments of the invention relate to a processing system for an input device comprising a display device. The processing system comprises: a display driver module configured to: output a placement guide graphic on a first display region of the display device, wherein the placement guide provides alignment indication for a feature of an input object; output a pressure-gauge graphic generated based on pressure exerted on the input device screen by an input object; and output the pressure-gauge graphic while the input object is still in contact with the input device; and a sensor module configured to: obtain, based on resulting signals received with at least one sensor electrode of a plurality of sensor electrodes, a first capacitive image comprising the input object, wherein the processing system is configured to authenticate a user based on at least the first capacitive image.

Other aspects of the invention will be apparent from the following description and the appended claims.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability.

Figure 1:
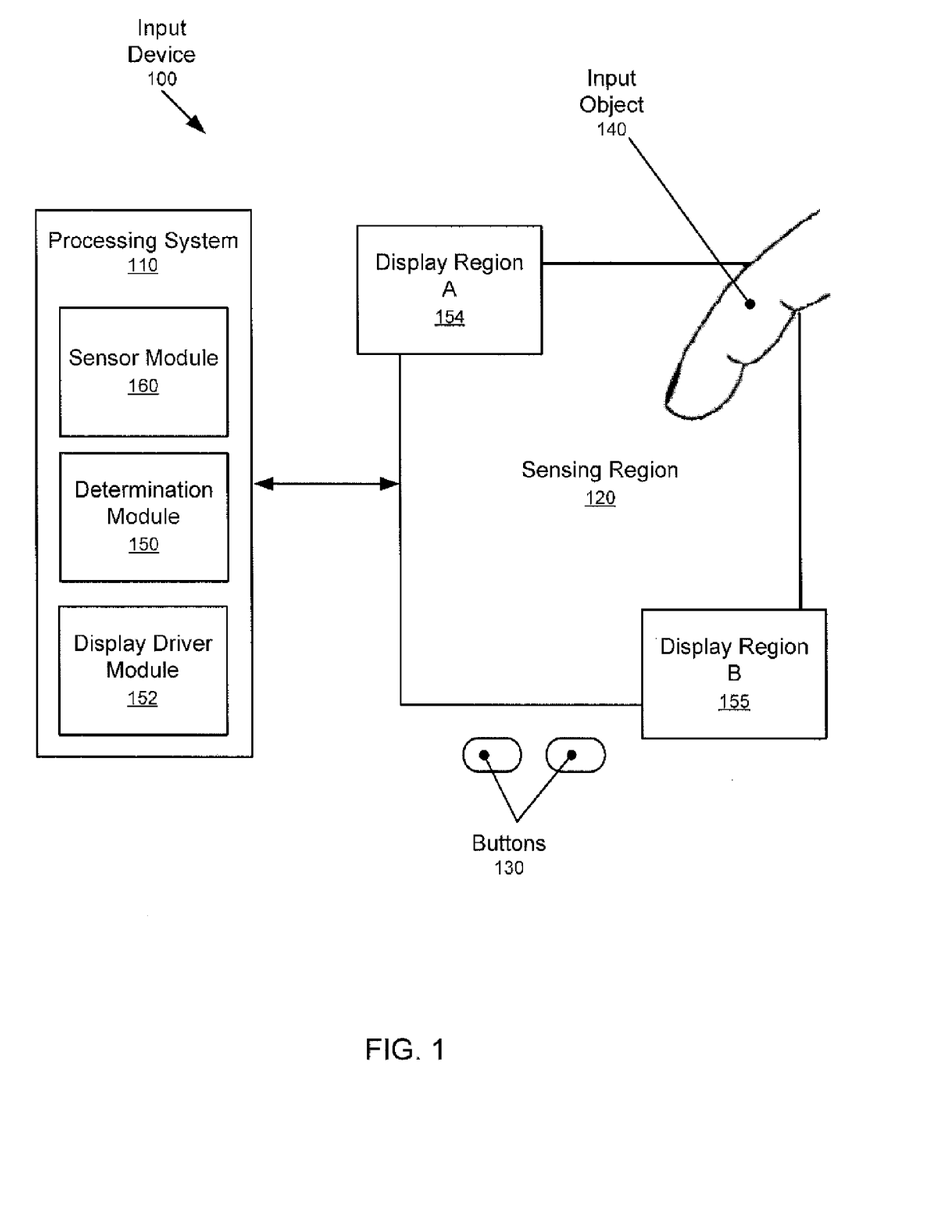
FIG. 1 shows a schematic diagram in accordance with one or more embodiments.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) as part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects exist in the sensing region (120). Further, which particular input objects are in the sensing region may change over the course of one or more gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may by a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI, actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may configured for both display updating and input sensing. As another example, the display screen may be operated in part or in total by the processing system (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

Still referring to FIG. 1, in some embodiments, the input device (100) includes one or more display regions (e.g., Display Region A (154), Display Region B (155)). One or more of the display regions (154, 155) may partially overlap with the sensing region (120). In some embodiments, each display region is a display screen/device. Additionally or alternatively, multiple display regions may be implemented using a single display screen/device. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. In some embodiments, one or more of the display regions may be external to the sensing region (120). The display regions may be operated in part or in total by the processing system (110).

In various embodiments, the input device (100) operates as a biometric input device. Specifically, the user places an input object (140) (e.g., finger, hand, foot, ear, lips, etc.) on the input device (100) within the sensing region (120). The presence of the input object (140) alters the resulting signals being received by the processing system (110) from/using the electrodes. The sensor module (160) is able to generate/obtain a capacitive image that includes the input object (140), or at least a feature of the input object (140), based on the resulting signals. The capacitive image captures the attributes/details of the input object (140) and/or feature that are unique to the user. The processing system (110) can then authenticate the user based on the capacitive image. Specifically, the processing system (110) can compare the capacitive image with existing/stored biometric data to determine the identity of the user and/or the access rights of the user.

In various embodiments, the feature captured by the capacitive image corresponds to fingers. In such embodiments, comparing the capacitive image with biometric data may include the processing system (110) measuring/calculating lengths of the fingers in the capacitive image and matching the lengths to lengths recorded in the biometric data.

In various embodiments, the feature captured by the capacitive image corresponds to the palm of the user's hand. In such embodiments, comparing the capacitive image with biometric data may include the processing system (110) measuring the size/shape of the user's palm and matching the measured size/shape to sizes/shapes recorded in the biometric data.

In various embodiments, the capacitive image may be distorted due to low ground mass conditions. This may be especially true when the feature and/or the input object (140) is placed on the input device (100) in a direction that is orthogonal, or approximately orthogonal, to the rows, columns, or array of sensor electrodes. In one or more embodiments, the processing system (110) includes a display driver module (152). The display driver module (152) is configured to generate/output a placement guide graphic for display on a display region (e.g., Display Region A (154)) of the input device (100) that overlaps with the sensing region (120). The placement guide graphic provides an alignment indication e.g., a trace) for a feature of the input object (140). Specifically, the placement guide assists the user in positioning the input object and/or feature in a direction that is non-orthogonal (e.g. 39 degrees, 45 degrees, 51 degrees, etc.) to the direction of the rows, columns, and/or array of sensor electrodes. By placing the input object and/or feature in a non-orthogonal direction, a high-contrast capacitive image may be produced as compared to an orthogonal placement, where the image is largely washed out.

In one or more embodiments, the placement guide graphic may keep portions of the input object and/or the feature off of the input device (100) and/or external to the sensing region (120), and thus reduce the likelihood of distortions in the capacitive image. For example, the displayed placement guide graphic may be sufficiently close to an edge of the input device (100) and/or sensing region (120) that if the user places the input object/feature on the input device (100) according to the placement guide graphic, a portion of the input object/feature will not make contact with the input device (100) and/or will be external to the sensing region (120). As discussed above, the feature may be the palm of the user's hand. The placement guide graphic may be displayed such that if the user follows the placement guide graphic, a portion of the palm is off the input device (100) or outside the sensing region (120), and thus the likelihood of distortions in the capacitive image is reduced.

In one or more embodiments, the processing system (110) may reduce distortions in the capacitive image by applying an image correction algorithm using both transcapacitive and absolute capacitive measurements. Furthermore, the correction algorithm may be enhanced based on an estimate of the angle of placement (e.g. 52 degrees vs. 45 degrees).

A user may place a hand (or other input object/feature) on any area of the input device (100), at varying angles, and with variable separation among fingers. The matching algorithm may include correction for pixel aliasing due to translation, rotational correction, and a finger-model to handle variable gaps between fingers. In one or more embodiments, these corrections may be performed by applying an affine transformation to the capacitive image. The finger model can include a low ground mass model, as finger distortion will vary considerably as space between fingers varies. In various embodiments, it may be preferable to require fingers be held close together, in this case the processing system (110) can detect the separation and issue instructions or an alert (e.g., text, audio, etc.) to guide user. In other words, separated fingers may be considered a type of misplacement. Upon detection of the misplacement, a request for the correct placement of the feature (e.g., hand) may be issued to the user.

In various embodiments, the false rejection rate (FRR) may be, to a large extent, a function of pressure exerted by the input object (e.g., hand) on the input device (100). In other words, if the input object (140) exerts uniform or approximately uniform pressure on the input device (100), the processing system (110) is more likely to generate a capacitive image that is well suited for comparison with stored biometric data. However, if different points of the input object exert large differences in pressure on the input device, the processing system (110) is likely to generate a capacitive image that does not match stored biometric data, even though the user should be authenticated.

In one or more embodiments, the display driver module (152) generates/outputs a pressure-gauge graphic based on the pressures exerted on the input device (100) by the input object (140). In some embodiments, the pressure-gauge graphic is generated based on the resulting signals received by the processing system (110). Specifically, as pressure exerted by the input object (140) (e.g., finger) increases, more surface area of the input object (140) makes contact with the sensing region (120), changing the resulting signals. Accordingly, pressure may be inferred from the resulting signals. Additionally or alternatively, the input device (100) may include pressure sensors or gauges (not shown) to directly measure the pressures exerted on the input device (100) by the input object (140). The pressure-gauge graphic shows the differences in pressure exerted by different portions/regions of the input object (140) on the input device (100). For example, the pressure-gauge graphic may be a color contour map, with different colors identifying different pressures. In such examples, uniform or approximately uniform pressure may be denoted by a single color in the color contour map.

In one or more embodiments, the processing system (110) outputs the pressure-gauge graphic for display on one of the display regions (e.g., Display Region B (155)). The displayed pressure-gauge graphic provides the user with real-time feedback. A user, upon viewing the pressure-gauge graphic could increase pressure in "soft" spots and could decrease pressure in "hard" spots until the pressure-gauge graphic showed a uniform or approximately uniform pressure exerted by the input device.

The image acquisition and enrollee matching may be implemented entirely or partially within the capacitive sensing integrated circuit. In one or more embodiments, the changes/effects in the resulting signals caused by the input object (140) may be used as both a wake-up signal (i.e., to a host processor attached to the input device) and biometric. Processing system (110) may have a simple list of excluders to declare a large object as a non-biometric and if so declared would not disturb the sleeping host processor. Or if not declared "excluded", the host process may be awoken and passed one or more frames of the hand-like image for matching with previously stored enrollee image(s). In some embodiments, the matching may be completed within processing system (110) and once a user is matched, the host may be woken up.

Figure 6:
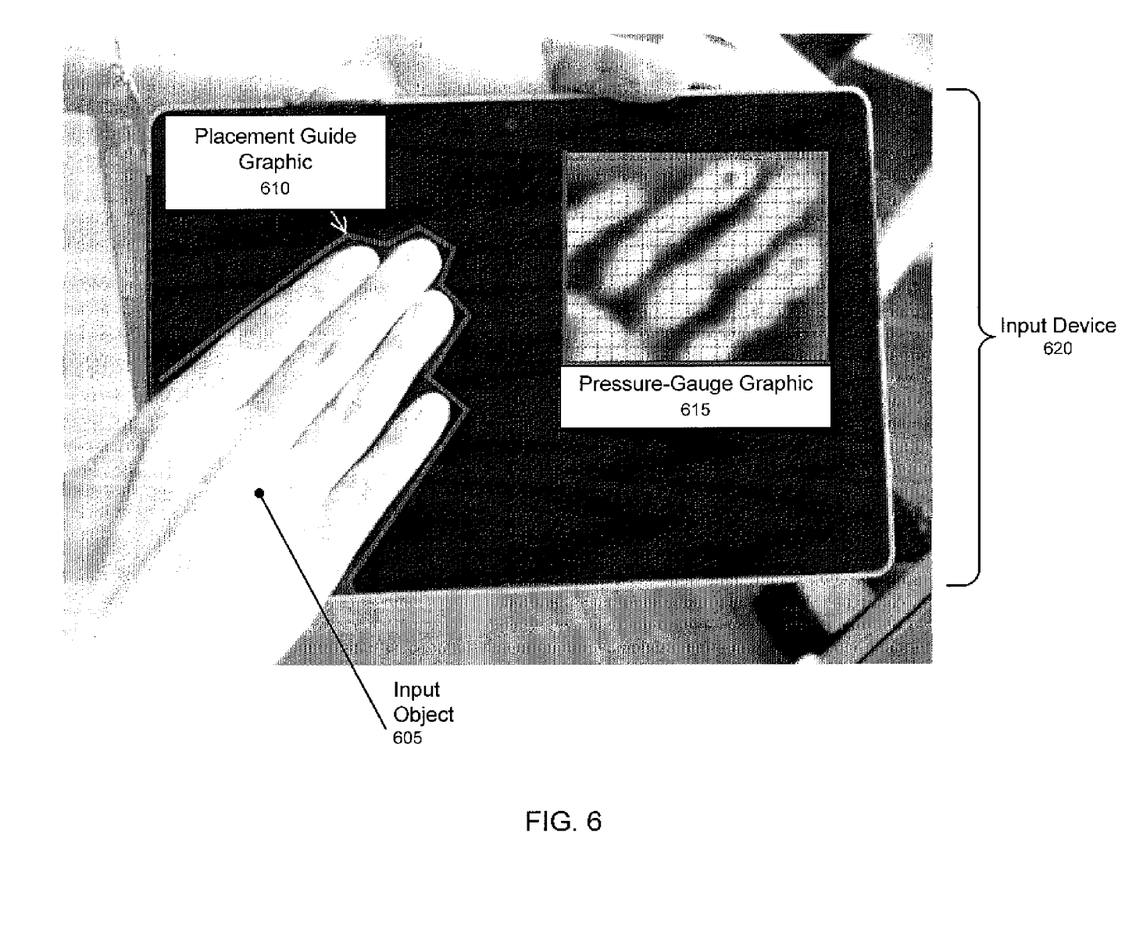

FIG. 6 shows an example in accordance with one or more embodiments. As shown in FIG. 6, there exists an input device (620). The input device (620) includes a display region for displaying a placement guide graphic (610). The placement guide graphic (610) is a trace or alignment indication for the user. Specifically, the placement guide graphic (610) assists the user in positioning the input object (605) on the input device (620). As shown in FIG. 6, the displayed placement guide graphic (610) keeps a portion of the input object (605) off the input device to reduce distortions. Assume the sensing electrodes of the input device (620) are arranged in rows and columns that are parallel to the edges of the input device (620). The placement guide graphic (610) positions the input object (605) so that it is non-orthogonal to the directions of the sensor electrodes, and thus capacitive images with higher contrasts are generated.

Still referring to FIG. 6, the input device (620) has a display region for displaying a pressure-gauge graphic (615). As shown in FIG. 6, the pressure-gauge graphic 615 may be a color contour map that provides feedback to the user. The user may increase or decrease the pressure exerted on the input device (620) by different points/regions of the input object (605) until a uniform or approximately uniform pressure is exerted. This results in capacitive images of the input object that are better suited for comparison against stored biometric data.

Referring back to FIG. 1, in one or more embodiments, the processing system (110) is configured to generate multiple capacitive images while the user is performing (e.g., with an input object (140)) a gesture within the sensing region (120). These capacitive images may be combined to generate an overlay image, and the overlay image may be used to authenticate the user or unlock a device. Those skilled in the art, having the benefit of this detailed description, will appreciate that the overlay image may be used for authentication because two users performing the same gesture with the same input object (e.g., hand) will result in different overlay images. In other words, the overlay image is unique to the user.

Figure 4:
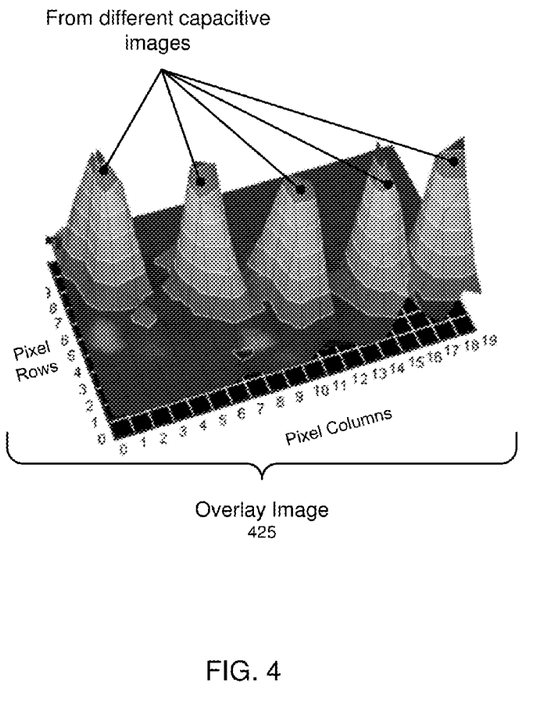
FIGS. 4-6 shows examples in accordance with one or more embodiments.

FIG. 4 shows an example overlay image (425) in accordance with one or more embodiments. As shown in FIG. 4, the overlay image (425) is composed of multiple capacitive images. Each capacitive image is generated while the user is performing the gesture. Accordingly, each capacitive image is a snapshot of the gesture at a time point.

Figure 5:
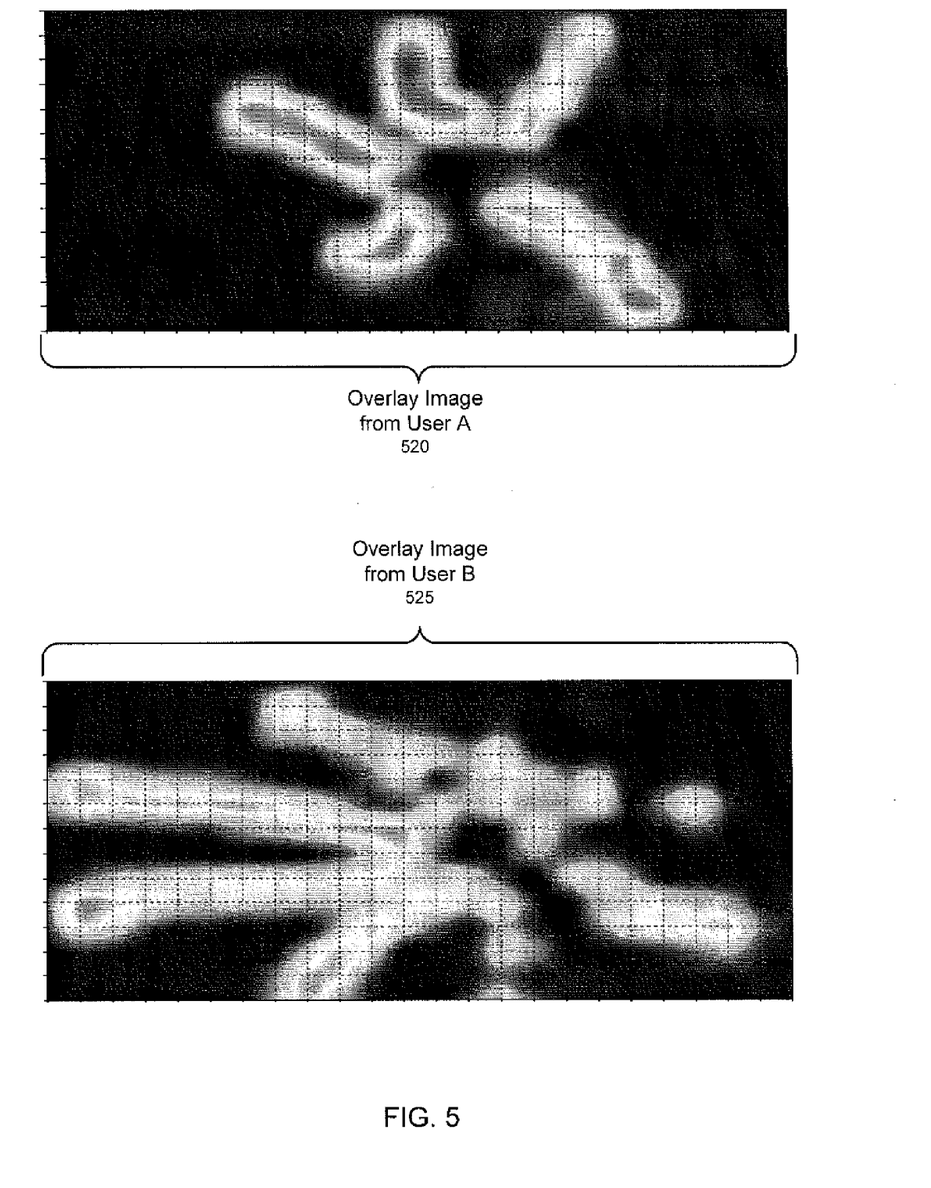

FIG. 5 shows two example overlay images from two different users: Overlay Image from User A (520), Overlay Image from User B (525). Specifically, the overlay image (520) results from user A performing a gesture, while the overlay image (525) results from user B performing the same gesture. As shown in FIG. 5, each overlay image is unique to its user. According, the overlay image may be used to distinguish the user from other users, and to authenticate the user.

Figure 2:
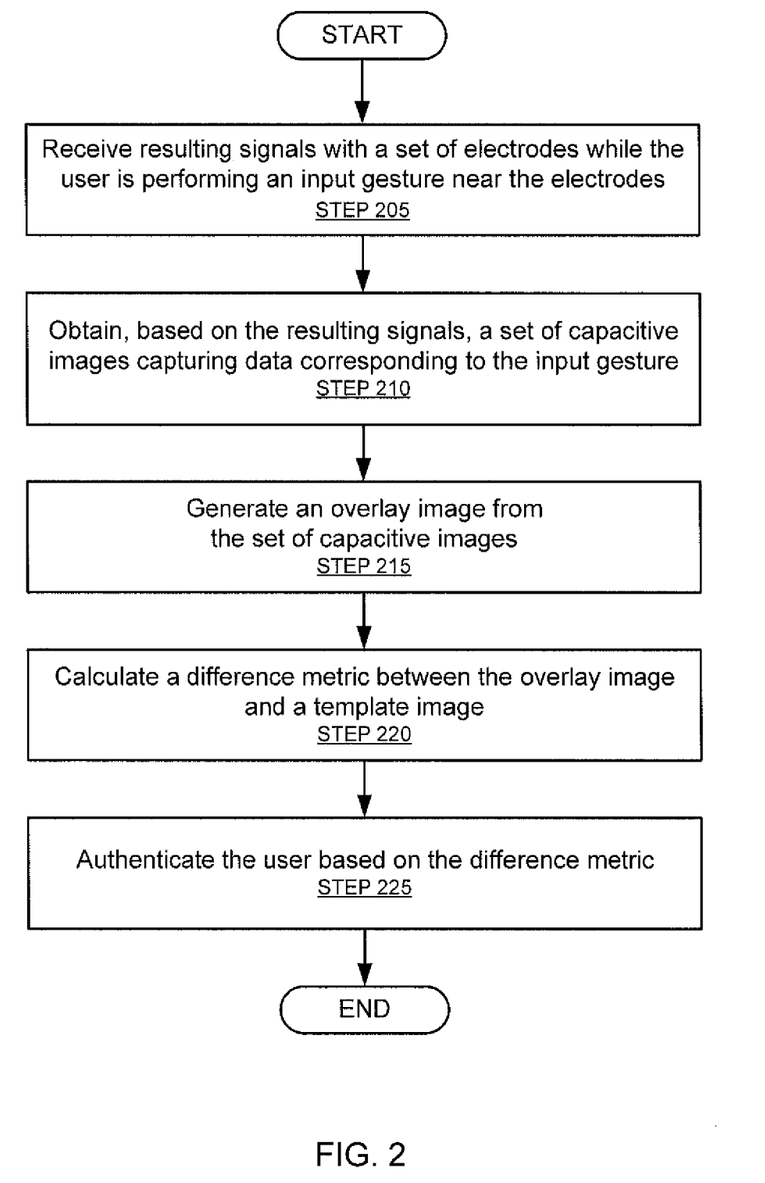
FIG. 2 and FIG. 3 show flowcharts in accordance with one or more embodiments.

FIG. 2 shows a flowchart in accordance with one or more embodiments. The process shown in FIG. 2 may involve, for example, one or more components discussed above in reference to FIG. 1 (e.g., processing system (110)). One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

In Step 205, resulting signals are received with a set of electrodes while a user is performing a gesture near the electrodes. In other words, the user is performing a gesture within the sensing region of an input device. The gesture may be performed using an input object (e.g. hand). For example, the gesture may include the user spreading his fingers. As another example, the gesture may include the user moving all of his fingertips towards a time point. As yet another example, the gesture may include the user sliding this thumb away from the rest of this hand.

In one or more embodiments of the invention, multiple images (e.g., an animation) may be displayed on the touchscreen to guide/instruct the user on how to perform the gesture.

In Step 210, multiple capacitive images are generated from the resulting signals. Each capacitive image may be considered a glimpse of the gesture at a different time point. The capacitive images capture data associated with the gesture. In one or more embodiments of the invention, some or all of the generated capacitive images are the same size (i.e., they have the same number of pixels).

In Step 215, an overlay image is generated from the capacitive images. The overlay image may be the same size (i.e., same number of pixels) as each capacitive image. Pixels in the same position (e.g., same coordinates) across the multiple capacitive images and the overlay image may be referred to as shared pixels.

In one or more embodiments, the overlay image is generated by selecting a pixel in the overlay image, identifying the values of the shared pixels, corresponding to the selected pixel, in the capacitive images, and then setting the selected pixel to the maximum identified value. This process may be repeated for all pixels in the overlay image.

In one or more embodiments, the overlay image is generated using an overlay buffer. The first of the multiple capacitive images is copied into the overlay buffer. After the first capacitive image, subsequent capacitive images are copied into the overlay buffer on a per-pixel basis, selected for the greater value. Expressed mathematically, OverlayImage[i]=max(OverlayImage[i], CapacitiveImage[i]). Those skilled in the art, having the benefit of this detailed description, will appreciate that by using the overlay buffer, the user does not need to synchronize the landing or lifting of fingers.

In Step 220, a difference metric is calculated between the overlay image and a template image. Specifically, there may exist one or multiple template images. Each template image corresponds to the overlay image generated during the enrollment of a user. The overlay image, generated in Step 215, is effectively moved across a template image (e.g., 1 mm increments along each axis) until a best fit is achieved. The difference between the overlay image and the template in this best fit position is the difference metric. In one or more embodiments of this invention, the difference metric is a 2D array having the same size as the template image and the overlay image. Each entry in the 2D array stores the difference between the corresponding pixels of the overlay image and the template image in the best fit position. If the difference metric falls below a predetermined threshold (e.g., 85% of the entries in the 2D array are less 0.2), the user is authenticated (Step 225). This authentication may also trigger the host to exit a sleep or low-power state and enter an active or full-power state.

Figure 3:
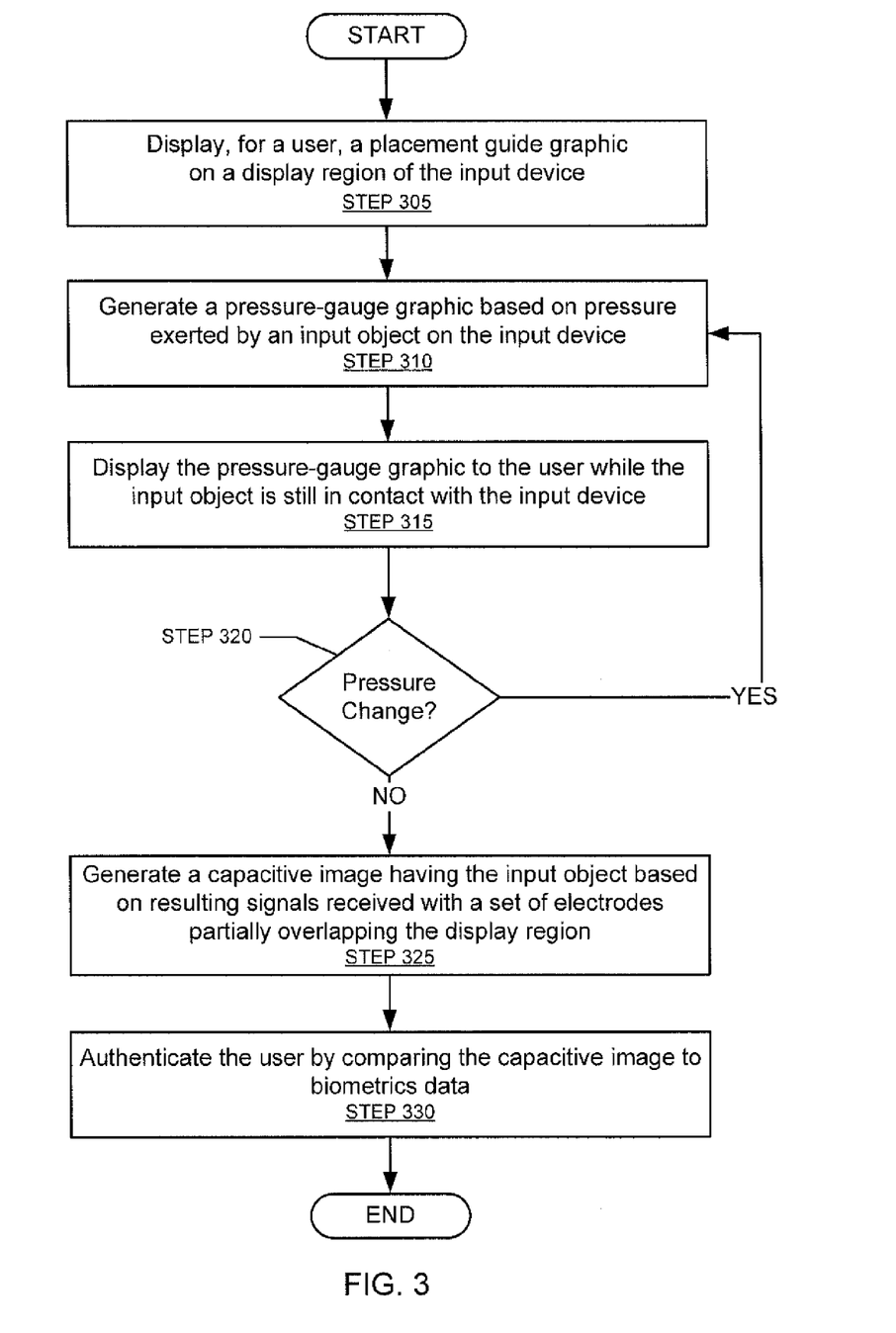

FIG. 3 shows a flowchart in accordance with one or more embodiments. The process shown in FIG. 3 may involve, for example, one or more components discussed above in reference to FIG. 1 (e.g., processing system (110)). One or more steps shown in FIG. 3 may be omitted, repeated, and/or performed in a different order among different embodiments of the invention. Accordingly, embodiments of the invention should not be considered limited to the specific number and arrangement of steps shown in FIG. 3. The process shown in FIG. 3 may be performed before or after the process shown in FIG. 2.

In Step 305, a placement guide graphic is displayed on a display region of the input device. The placement guide graphic may be displayed in response to a user request to be authenticated using an input object (e.g., user's hand) or a feature of the input object. As discussed above, the placement guide graphic provides an alignment indication (e.g., a trace) for a feature of the input object. Specifically, the placement guide assists the user in positioning the input object and/or feature in a direction that is non-orthogonal (e.g. 39 degrees, 45 degrees, 51 degrees, etc.) to the direction of sensor electrodes in the input device. By placing the input object and/or feature in a non-orthogonal direction, a high-contrast capacitive image may be produced as compared to an orthogonal placement, where the image is largely washed out.

As also discussed above, the placement guide graphic may keep portions of the input object and/or the feature off of the input device, and thus reduce the likelihood of distortions in the capacitive image. For example, the displayed placement guide graphic may be sufficiently close to an edge of the input device and/or sensing region that if the user places the input object/feature on the input device according to the placement guide graphic, a portion of the input object/feature will not make contact with the input device and/or will be external to the sensing region.

In Step 310, a pressure-gauge graphic is generated based on pressure exerted by the input object on the input device. In other words, once the user places, according to the placement guide graphic, the input object on the input device, the pressures exerted by various points/regions of the input object are determined and used to generate the pressure-gauge graphic. The pressure-gauge graphic may be a color contour map. If the entire map is the same color, the input object is exerting uniform pressure or approximately uniform pressure on the input device. However, if the map is different colors, different regions of the input object are exerting different pressure (i.e., the input object is not exerting uniform pressure).

In Step 315, the pressure-gauge graphic is displayed to the user. The pressure-gauge graphic may be displayed on a display region of the input device. Additionally or alternatively, the pressure-gauge graphic may be displayed on a display device that is external to the input device.

In Step 320, it is determined whether the user is changing the pressure exerted by the input object on the touchscreen. The displayed pressure-gauge graphic provides the user with real-time feedback. A user, upon viewing the pressure-gauge graphic could increase pressure in "soft" spots and could decrease pressure in "hard" spots until the pressure-gauge graphic showed a uniform or approximately uniform pressure exerted by the input device. When it is determined that the exerted pressure has changed in excess of a predetermined threshold, the process returns to Step 310. When it is determined that the exerted pressure has remained constant for a predetermined time interval, the process proceeds to Step 325.

In Step 325, a capacitive image is generated based on the resulting signals received with the sensing electrodes. The capacitive image captures the attributes/details of the input object and/or feature that are unique to the user. This capacitive image may be one of the capacitive images mentioned in Step 210, discussed above in reference to FIG. 2.

In Step 330, the user is authenticated by comparing the capacitive image to stored biometrics data. Specifically, the capacitive image is compared with existing/stored biometric data (i.e., biometric data provided during user enrollment) to determine the identity of the user and/or the access rights of the user. This authentication may grant the user access to one or more secure resources. This authentication may also trigger the host to exit a sleep or low-power state and enter an active or full-power state.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. An input device comprising:
a display device comprising a first display region;
a plurality of sensor electrodes configured for capacitive sensing, wherein the plurality of sensor electrodes overlap at least a portion of the first display region; and
a processing system operatively connected to the plurality of sensor electrodes and configured to:
output a placement guide graphic on the first display region, wherein the placement guide graphic provides alignment indication for a feature of an input object, and wherein the placement guide graphic comprises a trace outlining the feature of the input object;
generate a pressure-gauge graphic based on pressure exerted on the input device by the input object, wherein the pressure-gauge graphic displays a plurality of pressures exerted by different regions of the input object on the input device;
send the pressure-gauge graphic for display while the input object is still in contact with the input device;
obtain, based on resulting signals received with at least one sensor electrode of the plurality of sensor electrodes, a first capacitive image comprising the input object; and
authenticate a user based on at least the first capacitive image.

2. The input device of claim 1, wherein the user is authenticated by comparing the first capacitive image to a plurality of biometric data.

3. The input device of claim 2, wherein the feature comprises fingers, and wherein the comparison comprises measuring lengths of the fingers in the first capacitive image and matching the lengths to a portion of the plurality of biometric data.

4. The input device of claim 1, wherein the feature is a palm of a hand, and wherein the placement guide graphic is configured such that a portion of the palm of the hand is external to a sensing region of the input device.

5. The input device of claim 1, wherein the feature comprises fingers of a hand, and wherein the placement guide graphic is configured to align the fingers of the hand along a first direction, wherein the plurality of sensor electrodes are disposed along a second direction, and wherein first direction is non-orthogonal with the second direction.

6. The input device of claim 1, wherein the feature comprises fingers of a hand, and wherein the processing system is further configured to:
 detect separation between the fingers on the input device; and
 send an alert requesting the user reduce the separation between the fingers on the input device.

7. The input device of claim 1, further comprising a second display region, wherein the pressure-gauge graphic is displayed on the second display region.

8. The input device of claim 1, wherein the pressure-gauge graphic is a color contour map.

9. The input device of claim 1, wherein the first display region, the plurality of sensors, and the processing system are located on a mobile phone.

10. The input device of claim 1, wherein the processing system is further configured to:
 obtain, based on the resulting signals, a second capacitive image comprising the input object during an input gesture,
 wherein the first capacitive image comprises a portion of the input object at a first coordinate, and
 wherein the second capacitive image comprises the portion of the input object at a second coordinate;
 generate an overlay image from the first capacitive image and the second capacitive image, the overlay image comprising the portion of the input object at the first coordinate within the overlay image and the portion of the input object at the second coordinate within the overlay image; and
 calculate a difference metric between the overlay image and a template image.

11. A method for operating an input device comprising a display device, comprising:
 displaying, on a first display region of the display device, a placement guide graphic, wherein the placement guide graphic provides alignment indication for a feature of an input object, and wherein the placement guide graphic comprises a trace outlining the feature of the input object;
 generating a pressure-gauge graphic based on pressure exerted on the input device by the input object, wherein the pressure-gauge graphic displays a plurality of pressures exerted by different regions of the input object on the input device;
 sending the pressure-gauge graphic for display while the input object is still in contact with the input device;
 obtaining, based on resulting signals received with at least one sensor electrode of a plurality of sensor electrodes, a first capacitive image comprising the input object; and
 authenticating the user by comparing the first capacitive image to a plurality of biometrics data.

12. The method of claim 11, wherein the feature comprises fingers of a hand, and wherein the comparison comprises:
 measuring lengths of the fingers in the first capacitive image; and
 matching the lengths to a portion of the plurality of biometric data.

13. The method of claim 11, wherein the feature is a palm of a hand, and wherein the placement guide graphic is configured such that a portion of the palm of the hand is external to a sensing region of the input device.

14. The method of claim 11, wherein the feature comprises fingers of a hand.

15. The method of claim 14, wherein the placement guide graphic is configured to align the fingers of the hand along a first direction, wherein the plurality of sensor electrodes are disposed along a second direction, and wherein first direction is non-orthogonal with the second direction.

16. A processing system for an input device comprising a display device, the processing system comprising:
 a display driver module configured to:
  output a placement guide graphic on a first display region of the display device, wherein the placement guide graphic provides alignment indication for a feature of an input object, and wherein the placement guide graphic comprises a trace outlining the feature of the input object;
  output a pressure-gauge graphic generated based on pressure exerted on the input device screen by an input object, wherein the pressure-gauge graphic displays a plurality of pressures exerted by different regions of the input object on the input device; and
  output the pressure-gauge graphic while the input object is still in contact with the input device; and
 a sensor module configured to:
  obtain, based on resulting signals received with at least one sensor electrode of a plurality of sensor electrodes, a first capacitive image comprising the input object,
 wherein the processing system is configured to authenticate a user based on at least the first capacitive image.

17. The processing system of claim 16, wherein authenticating the user comprises comparing the first capacitive image to a plurality of biometrics data.

18. The processing system of claim 17, wherein the feature comprises fingers of a hand, and wherein the comparison comprises:
 measuring lengths of the fingers in the first capacitive image; and
 matching the lengths to a portion of the plurality of biometric data.

19. The processing system of claim 17, wherein the feature is a palm of a hand, and wherein the placement guide graphic is configured such that a portion of the palm is external to a sensing region of the input device.

20. The processing system of claim 16, wherein the pressure-gauge graphic is displayed on a second display region of the display device.

21. The processing system of claim 16, wherein the placement guide graphic is configured to align the fingers of the hand along a first direction, wherein the plurality of sensor electrodes are disposed along a second direction, and wherein first direction is non-orthogonal with the second direction.

22. The processing system of claim 16, wherein the processing system is further configured to:
   detect separation between the fingers on the input device; and
   send an alert requesting the user reduce the separation between the fingers on the input device.

23. The processing system of claim 16, wherein the sensor module is further configured to:
   obtain, based on the resulting signals, a second capacitive image comprising the input object,
   wherein the first capacitive image comprises a portion of the input object at a first coordinate, and
   wherein the second capacitive image comprises the portion of the input object at a second coordinate;
   generate an overlay image from the first capacitive image and the second capacitive image the overlay image comprising the portion of the input object at the first coordinate within the overlay image and the portion of the input object at the second coordinate within the overlay image; and
   calculate a difference metric between the overlay image and a template image.

* * * * *